United States Patent [19]

Marcus et al.

[11] Patent Number: 4,468,062
[45] Date of Patent: Aug. 28, 1984

[54] SIDE WINDOW VISOR

[75] Inventors: Konrad H. Marcus; Dennis J. Fleming, both of Holland, Mich.

[73] Assignee: Prince Corporation, Holland, Mich.

[21] Appl. No.: 392,240

[22] Filed: Jun. 25, 1982

[51] Int. Cl.³ .............................................. B60J 3/02
[52] U.S. Cl. .................................. 296/97 G; 296/97 K
[58] Field of Search ................ 296/97 G, 97 R, 97 K; 160/DIG. 3, DIG. 2

[56] References Cited

U.S. PATENT DOCUMENTS 2,101,901 12/1937 Fletcher ............................ 296/97 G
2,289,644 7/1942 Gano, Jr. ........................... 296/97 G

FOREIGN PATENT DOCUMENTS 36659 9/1926 Denmark ........................... 296/97 G
1802620 8/1969 Fed. Rep. of Germany ... 296/97 G
1102089 2/1968 United Kingdom ............. 296/97 G

*Primary Examiner*—Robert R. Song
*Attorney, Agent, or Firm*—Price, Heneveld, Huizenga & Cooper

[57] ABSTRACT

Visors embodying the present invention include a mounting structure secured to the headliner of a vehicle above a side window and a pair of parallel spaced arms, each pivotally coupled at one end to the mounting structure secured to the vehicle headliner and having opposite ends pivotally secured to a sun shield such that the shield can be pivoted by rotation of the parallel arms between a raised or stored position above the side window downwardly to a lowered use position.

10 Claims, 4 Drawing Figures

SIDE WINDOW VISOR

BACKGROUND OF THE INVENTION

The present invention relates to vehicle visors and particularly visors adapted for use with the side windows.

Conventional visors currently used in vehicles, such as automobiles, typically pivot about a generally vertical axis for movement from the windshield position to a side window position for use in blocking sunlight entering the vehicle from a side. Such movement of the visor during operation of the automobile by the driver, necessitated by a change in vehicle direction with respect to incoming sunlight, can be somewhat hazardous inasmuch as frequently it is necessary to duck under the visor as it is pivoted from the forward windshield position to the side window position. Additionally, with sliding visors of the type disclosed in U.S. Pat. No. 2,289,644 which slide down from the headliner of a vehicle, such visors cannot be employed for shielding sunlight from the side window area. With sliding visors of the type represented by U.S. Pat. No. 2,559,471, the operation of the visor which is guided within an edge track can be extremely troublesome since frequently they will stick and be difficult to operate since they do not slide smoothly between a raised stored and a lowered use position.

SUMMARY OF THE INVENTION

The visor construction of the present invention overcomes the deficiencies of the prior art by providing a pivoting visor assembly particularly adapted for use for a side window of a vehicle.

Visors embodying the present invention include a mounting structure secured to the headliner or roof of a vehicle above a side window and a pair of parallel spaced arms, each pivotally coupled at one end to the mounting structure secured to the vehicle headliner and having opposite ends pivotally secured to a sun shield such that the shield can be translated by rotation of the parallel arms between a raised or stored position above the side window downwardly to a lowered use position. In the preferred embodiment of the invention, a module which can be snap-fitted to the vehicle roof is provided with the pivoted visor being recessed behind a decorative panel and including means to facilitate lowering and raising of the visor to any selected position.

These and other features, objects and advantages of the present invention will become apparent upon reading the following description thereof together with reference to the drawings in which:

DETAILED DESCRIPTION OF THE PREFERRED EMBODIMENT

Figure 1:
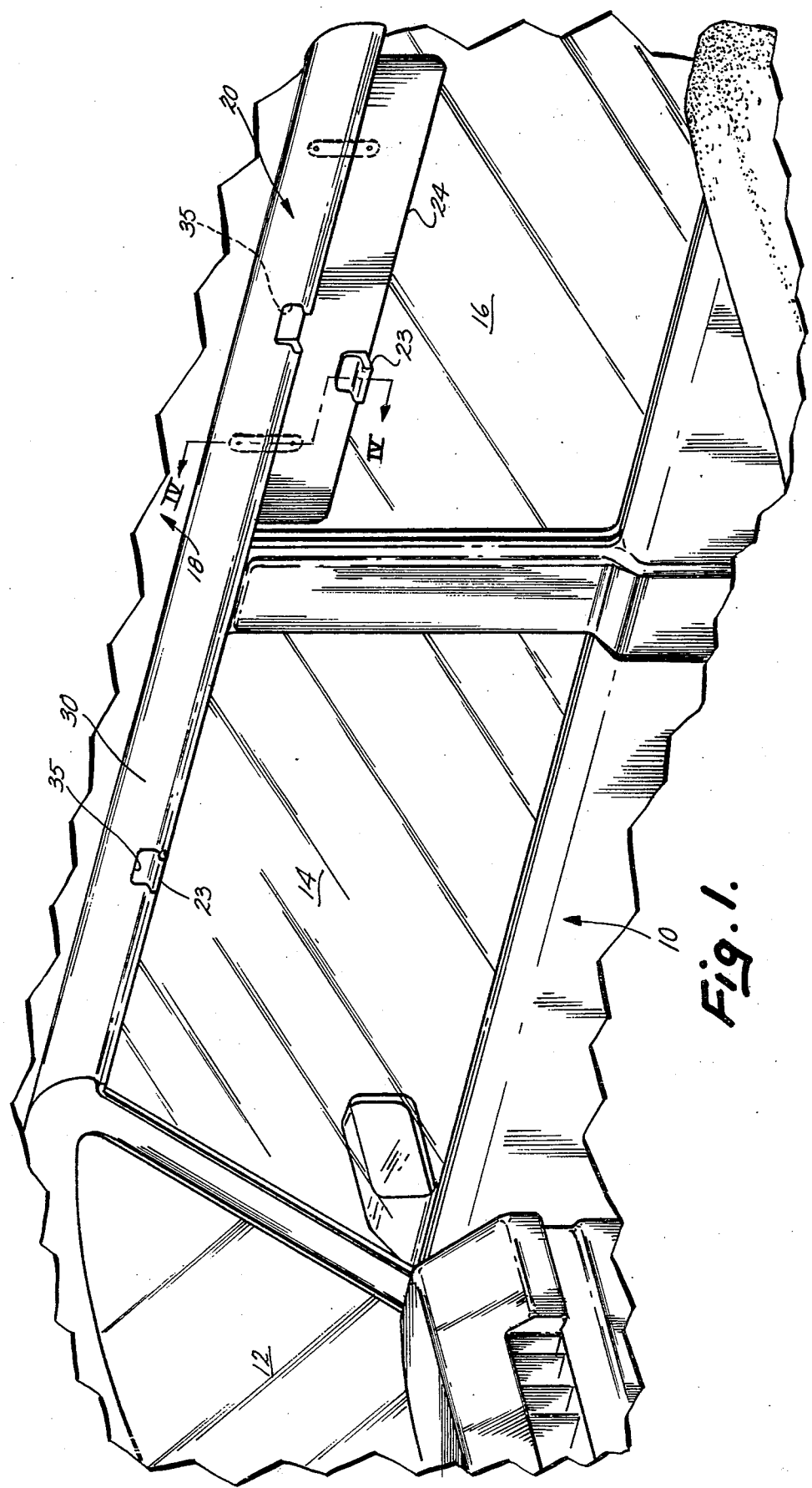
FIG. 1 is a fragmentary perspective view of a vehicle embodying a visor system of the present invention.

Referring initially to FIG. 1, there is shown the right front interior of a vehicle 10 which includes a windshield 12, a right side front passenger side window 14 and a rear seat right side passenger window 16. Extending above the window is the ceiling or headliner area 18 of the vehicle which typically is upholstered with a fabric conforming to the vehicle's general interior decor. The headliner frequently will include a snap-in upholstered panel conventionally secured to the sheetmetal roof of the vehicle by means of conventional mounting structure adapted to receive snap fasteners, screws or the like. Extending along the lower edge of the headliner just above the passenger windows 14 and 16 is an integral visor assembly module 20 incorporating a pair of downwardly pivoted visor assemblies 21 embodying the present invention and shown in greater detail in FIGS. 2 through 4. In FIG. 1, the forward visor assembly is shown in its stored position concealed within the module 20 and therefore, the headliner of the vehicle with the rear seat visor assembly being shown in the lowered use position. The construction and operation of each of the visor assemblies contained in module 20 is now described in connection with FIGS. 2 through 4.

Figure 2:
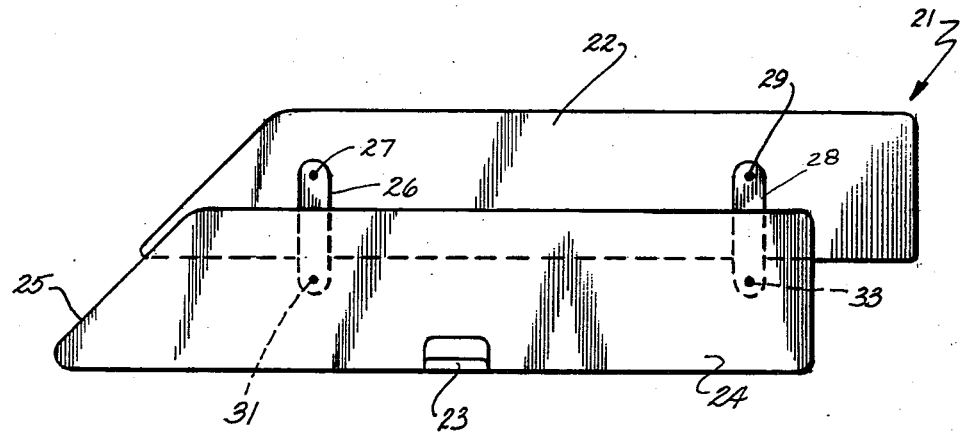
FIG. 2 is an enlarged side elevational view of a visor assembly embodying the present invention shown with the visor in the lowered use position.
Figure 3:
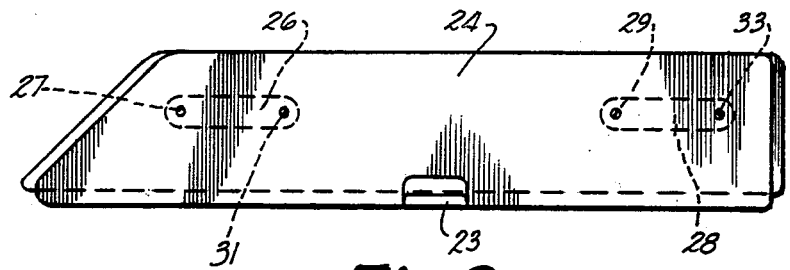
FIG. 3 is a side elevational view of the structure shown in FIG. 2 showing the visor in an elevated stored position.
Figure 4:
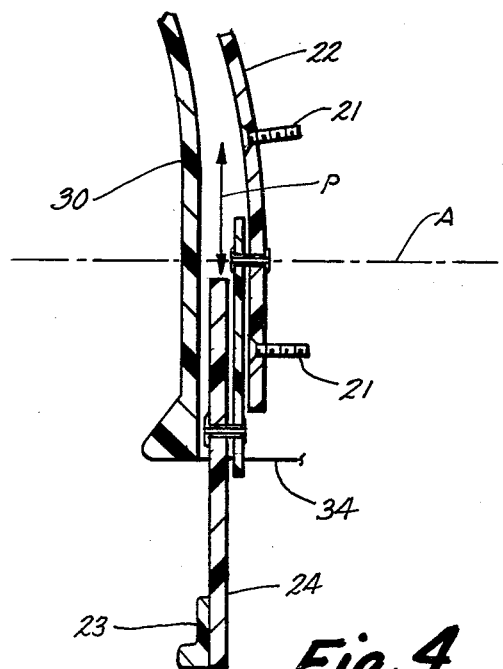
FIG. 4 is a cross-sectional view taken along section line IV—IV of FIG. 1.

Referring initially to FIGS. 2 and 3 which illustrate the visor assembly employed in the front side window area of module 20, a fixed support member 22 is provided and has a generally trapezoidal planar shape, and is slightly curved in cross-section (FIG. 4). Its shape will vary as desired to conform to the headliner area above the side window as necessary for a given vehicle. Pivotally coupled to the fixed support member 22 is a visor panel 24 which can be opaque, translucent or transparent of a tinted material typically a polymeric material such as an acrylic and having a thickness of about 0.125 inches. Visor panel 24 is also trapezoidal shape having a tapered leading edge 25 corresponding to the angle of the leading edge of window 14 near the top as seen in FIG. 1 to cover this triangular area of the window.

Visor panel 24 is pivotally coupled to support member 22 by means of a pair of spaced parallel legs 26 and 28 each having one end 27 and 29, respectively, pivotally mounted to fixed member 22 and an opposite end 31 and 33, respectively, pivotally coupled to visor panel 24 as shown. Legs 26 and 28 are made of a thin resilient material and in the preferred embodiment were made of ABS having a thickness of about 0.060 inches. Members 22, 24, 26 and 28 form a parallelogram providing substantially uniform translating motion of visor panel 24 with respect to fixed member 22 between the lowered position shown in FIG. 2 in which the legs 26 and 28 are substantially vertical and a stored position in which the legs pivot in a counterclockwise direction to a substantially horizontal position to elevate the visor to a stored position. Naturally, the rear seat visor assembly 21 will include a visor panel which may be of a different shape than panel 24 shown in FIG. 2 and in the embodiment shown, is a generally rectangular panel, as seen in FIG. 1.

In the preferred embodiment of the invention, the support member 22, as best seen in FIG. 4, is slightly curved to conform to the roof line of the vehicle and is secured to mounting nuts (not shown) welded or otherwise suitably attached to the sheetmetal roof of the vehicle by fastening means 21 such as screws, although snap fasteners also may be used. Pivot connections 27 and 31 can be provided by rivits extending through apertures formed in leg 26 and is also trapezoidal shape having a tapered leading edge 25 corresponding to the angle of the leading edge of window 14 near the top as seen in FIG. 1 to cover this triangular area of the window.

Visor panel 24 is pivotally coupled to support member 22 by means of a pair of spaced parallel legs 26 and 28 each having one end 27 and 29, respectively, pivotally mounted to fixed member 22 and an opposite end 31 and 33, respectively, pivotally coupled to visor panel 24 as shown. Legs 26 and 28 are made of a thin resilient material and in the preferred embodiment were made of ABS having a thickness of about 0.060 inches. Members 22, 24, 26 and 28 form a parallelogram providing substantially uniform pivoting motion of visor panel 24 with respect to fixed member 22 between the lowered position shown in FIG. 2 in which the legs 26 and 28 are substantially vertical and a stored position in which the legs pivot in a counterclockwise direction to a substantially horizontal position to elevate the visor to a stored position. Naturally, the rear seat visor assembly 21 will include a visor panel which may be of a different shape than panel 24 shown in FIG. 2 and in the embodiment shown, is a generally rectangular panel, as seen in FIG. 1.

In the preferred embodiment of the invention, the support member 22, as best seen in FIG. 4, is slightly curved to conform to the roof line of the vehicle and is secured to mounting nuts (not shown) welded or otherwise suitably attached to the sheetmetal roof of the vehicle by fastening means 21 such as screws, although snap fasteners also may be used. Pivot connections 27 and 31 can be provided by rivits extending through apertures formed in leg 26 and support member 22 and visor panel 24, as best seen in FIG. 4 and similarly for leg 28.

As seen in FIGS. 1 and 4, a decorative exterior panel 30 of integral construction and upholstered to match the upholstery of the vehicle extends from the forward part of the vehicle to cover the visor assemblies 21. The lower edge of panel 30 includes a pair of slots 34 for receiving therein the visor panels 24 which preferably include a handle 23 facilitating the lowering of the visor from a stored position, to a lowered position, as illustrated in FIGS. 1, 2 and 3. Handle 23 is recessed within a notch 35 formed in panel 30, as illustrated in FIG. 1. As illustrated also in FIG. 4, panel 30 is curved to conform to the curvature of the vehicle headliner at the innersection of the headliner with the upper portion above the side windows and can be secured in a conventional manner, by for example, using snap fasteners coupling this panel to the vehicle roof. In some installations, it may be desirable to eliminate support member 22 and employ in its place the decorative panel 30 as the support member.

The spacing between the various panels and legs is not critical, although generally a friction fit is desired so as to hold the visor 24 in any desired selected lowered position between the positions illustrated in FIGS. 2 and 3. Flexible legs 26 and 28 permit movement of the substantially flat visor panel 24 in the space between the curved panels 22 and 30. In the event visor 24 is made of a transparent material, it may be desirable to include vertical strips of wear-resistant material along the opposite edges to provide an innerface frictional contact surface between the visor 24 and panels 30 and 22 to serve as spacing members and prevent scratching of the transparent visor.

By providing a parallelogram-type innerconnection of visor 24 to a support member, smooth operation can be achieved to provide an infinitely adjustable visor, particularly suited for the side window of a vehicle. The visor moves downwardly and forwardly, as illustrated in FIGS. 1 through 3, in a plane P (FIG. 4) generally orthogonally related to the pivot axes A of the arms 26 and 28. The movement from the stored position to the use position of the front visor covers the front triangular corner of the front side window. The cover 30 can be integrally secured to supports 22 of one or both side window visors to provide an integral single or double visor module for assembly in a vehicle. Such visor construction can be relatively inexpensive to manufacture and install and provides an effective sun shading function.

It will become apparent to those skilled in the art that various modifications to the preferred embodiment of the invention described herein can be made without departing from the spirit or scope of the invention as defined in the appended claims.

The embodiments of the invention in which an exclusive property or privilege is claimed are defined as follows.

1. A visor assembly for a vehicle comprising:
   a visor panel;
   at least a pair of substantially parallel arms having a length less than the height of said visor panel, said arms spaced from one another and each having an end pivotally secured to said visor panel at spaced locations thereon;
   means for pivotally securing the opposite end of each arm to a vehicle to permit pivotal movement of said visor panel on said arms in a plane generally orthogonal to the pivot axes of said arms and parallel with said arms between a raised stored position and a lowered use position through a distance less than the height of said visor panel; and
   cover means concealing said visor panel and said arms when in a stored position.

2. The apparatus as defined in claim 1 wherein said securing means comprises a support member to which said opposite ends of said arms are pivotally secured, said securing means shaped to conform to a vehicle above a window.

3. The apparatus as defined in claim 2 wherein said cover means comprises a cover panel positioned to cover said support member and visor panel and including an opening along an edge thereof for permitting said visor to extend therethrough.

4. The apparatus as defined in claim 3 and further including a handle extending outwardly from said visor panel and a recess formed in said cover panel to nestably receive said handle when said visor panel is in a stored position, said handle facilitating the movement of said visor between said stored and lowered use positions.

5. The apparatus as defined in claim 4 and further including a second visor panel and parallel spaced legs pivotally mounting said second panel to a second support member and wherein said cover extends over both of said visor panels to define a module containing two spaced visor panels.

6. The apparatus as defined in claim 5 wherein said cover, said visor panels and said support members are shaped to fit along the side of a vehicle above the side windows thereof.

7. A side window visor assembly for a vehicle comprising:
- a generally trapezoidal shaped visor panel having a forward edge shaped to conform to the angled corner of a side window of a vehicle;
- at least a pair of parallel arms spaced from one another and each having one end pivotally secured to said visor panel near the vertical centerline of said panel, each of said arms having a length less than the height of said visor panel;
- means for pivotally securing the opposite end of each arm to a vehicle above the side window to permit pivotal movement of said visor panel on said arms in a plane generally orthogonal to the pivot axes of said arms and parallel with said arms between a raised stored position and a position lowered through a distance less than the height of said visor panel for use; and
- cover means for concealing said visor panel and said arms when in a stored position.

8. The apparatus as defined in claim 7 wherein said cover means comprises a panel shaped to cover and conceal said visor panel and said arms when in a stored position and wherein said means for pivotally securing opposite ends of said arms are positioned behind said cover panel means.

9. The apparatus as defined in claim 8 wherein said cover panel includes an opening along an edge thereof for permitting said visor to extend therethrough.

10. The apparatus as defined in claim 9 and further including a handle extending outwardly from said visor panel and a recess formed in said cover panel to nestably receive said handle when said visor panel is in a stored position, said handle facilitating the movement of said visor between said stored and lowered use positions.

* * * * *

UNITED STATES PATENT AND TRADEMARK OFFICE
CERTIFICATE OF CORRECTION

PATENT NO. : 4,468,062
DATED : August 28, 1984
INVENTOR(S) : Marcus et al.

It is certified that error appears in the above-identified patent and that said Letters Patent is hereby corrected as shown below:

Column 3, line 3:
    "rivits" should be ---rivets---

Column 3, lines 4-37:
    delete "is also..." through "leg 26 and"

Signed and Sealed this

Twelfth Day of March 1985

[SEAL]

Attest:

DONALD J. QUIGG

Attesting Officer    Acting Commissioner of Patents and Trademarks